United States Patent
Sugimoto et al.

(10) Patent No.: US 7,792,621 B2
(45) Date of Patent: Sep. 7, 2010

(54) APPARATUS FOR CONTROLLING SWIVEL ANGLES OF ON-VEHICLE HEADLIGHTS

(75) Inventors: Toshio Sugimoto, Okazaki (JP); Koji Ishiguro, Toyoake (JP)

(73) Assignee: Denso Corporation, Kariya (JP)

( * ) Notice: Subject to any disclaimer, the term of this patent is extended or adjusted under 35 U.S.C. 154(b) by 288 days.

(21) Appl. No.: 11/980,272

(22) Filed: Oct. 30, 2007

(65) Prior Publication Data

US 2008/0103661 A1 May 1, 2008

(30) Foreign Application Priority Data

Oct. 31, 2006 (JP) .............................. 2006-295285

(51) Int. Cl.
*G05D 1/00* (2006.01)
(52) U.S. Cl. ....................................... 701/49
(58) Field of Classification Search ................ 701/36, 701/49, 200, 223, 224, 226, 300; 340/995.2
See application file for complete search history.

(56) References Cited

U.S. PATENT DOCUMENTS 6,553,130 B1 * 4/2003 Lemelson et al. ........... 382/104
6,752,508 B2 6/2004 Kobayashi
2005/0169000 A1 * 8/2005 Hasegawa ................... 362/466

FOREIGN PATENT DOCUMENTS

JP 2003-048481 2/2003

* cited by examiner

*Primary Examiner*—Kim T Nguyen
(74) *Attorney, Agent, or Firm*—Harness, Dickey & Pierce, PLC

(57) ABSTRACT

An apparatus controls a swivel angle of on-vehicle headlights, the swivel angle of the lights being changeable in a lateral direction of the vehicle. A target swivel angle of the headlights is determined based on, for example, load map data of the road ahead the vehicle, and a control start point is determined based on the current position information and the road map data. The swivel angle is controlled to the target swivel angle in response to a state where the current position of the vehicle has reached the control start point. Running road shape-related information and a curvature direction of the road ahead are acquired. A control of the swivel angle toward the target swivel angle is prohibited when a direction of the target swivel angle determined is inconsistent with the curvature direction of the road, even in a case where the vehicle has reached the control start point.

8 Claims, 7 Drawing Sheets

(A)

(B)

APPARATUS FOR CONTROLLING SWIVEL ANGLES OF ON-VEHICLE HEADLIGHTS

CROSS-REFERENCE TO RELATED APPLICATION

This application is based on and claims the benefit of priority from earlier Japanese Patent Application No. 2006-295285 filed Oct. 31, 2006, the description of which is incorporated herein by reference.

BACKGROUND OF THE INVENTION

1. Technical Field of the Invention

The present invention relates to an apparatus for controlling swivel angles of headlights mounted on a vehicle (a headlight swivel controller), which controls a swivel angle of headlights which are mounted on the front of a vehicle in a horizontal plane to the vehicle body.

2. Description of the Related Art

A headlight swivel controller for controlling a swivel angle of headlights to an angle corresponding to a curvature of a road in front of a vehicle by controlling a driving device for headlights is known. Even when the vehicle is running on a curved road or even in a case where a curved road is present in front of the vehicle, the headlight swivel controller enables making an area illuminated by the headlights closer to the visible direction of the driver by changing the swivel angle of the headlights according to the shape of the road in front of the vehicle.

As a headlight swivel controller as described above, a device for determining a shape of a road in front of a vehicle based on a steering angle is known. Furthermore, as disclosed in Japanese Patent Application (unexamined) No. 2003-48481, a device for acquiring information on a shape of a road in front of a vehicle from a navigation apparatus is also known.

Generally speaking, since the former method is capable of judging a road shape more accurately, a steering angle swivel control based on a steering angle is executed when it can be judged that steering operation has been performed. Meanwhile, a navigation collaborative control using road information from the navigation apparatus is executed in a case where although a curved road is present in front of the vehicle but steering operation has been performed since the vehicle is still running on a straight road.

Meanwhile, there are some cases where a bypass road which is different from an original road is formed because of road construction or the like in actual roads. As a matter of course, the bypass road is not contained in road map data. Accordingly, in a case where the road map data is acquired from the navigation apparatus and the swivel angle is controlled based on the acquired road map data, a wrong control may be executed at a place where a temporary bypass road is formed.

In addition, in many cases a temporary bypass road has a shape in which the change curvature direction continuously changes within a short district. In a case where the curvature direction changes within a short district, the line of sight of the driver may be oriented not to a curved road or straight road on which the vehicle is currently running, but to a curved road or straight road which is coming next, or to another curved road or straight road after that. In this case, if the swivel angle is controlled based on the steering angle which corresponds to the current curved road, the swivel angle may be controlled into a wrong direction. In other words, a wrong control may be executed at a place where a temporary bypass road is formed, also when the steering angle swivel control is executed.

SUMMARY OF THE INVENTION

The present invention has been achieved in view of the foregoing circumstances, and an object of the present invention is to provide a headlight swivel controller which is capable of controlling a swivel angle with high reliability.

According to one aspect of the present invention, there is provided an apparatus for controlling a swivel angle of headlights mounted on a vehicle, wherein the swivel angle of the lights is changeable in a lateral direction of the vehicle, the apparatus comprising: a driving mechanism that changes the swivel angle of the headlights in the lateral direction; position information acquisition means for acquiring current position information which corresponds to a current position of the vehicle; road map data acquisition means for acquiring road map data of a road ahead based on the current position information; target angle determination means for determining a target swivel angle of the headlights based on the road map data of the road ahead acquired by the road map data acquisition means; control start point determination means for determining a control start point at a position closer to the vehicle than an end of a curved road positioned in front of the vehicle based on the current position information and the road map data of the road ahead; swivel control means for controlling the swivel angle to the target swivel angle determined by the target angle determination means by driving the driving mechanism in response to a state where the current position of the vehicle has reached the control start point; shape information acquisition means for acquiring running road shape-related information related to the shape of a road on which the vehicle is running, from the road on which the vehicle is running or an object on the road; road shape determination means for determining a curvature direction of the road ahead based on the running road shape-related information; and control prohibiting means for prohibiting a control of the swivel angle toward the target swivel angle in a case where a direction of the target swivel angle determined by the target angle determination means is inconsistent with the curvature direction of the road ahead determined by the road shape determination means, even in a case where the vehicle has reached the control start point.

According to this aspect of the present invention, the running road shape-related information which is related to the shape of a road on which the vehicle is running is acquired from the road on which the vehicle is running or an object on the road. The road shape determination means determines the curvature direction of the road ahead from the running road shape-related information. The curvature direction of the road ahead which is determined in this manner correctly indicates the curvature direction of the road, even if the road ahead is a bypass road which is temporarily provided. In addition, the swivel control means does not execute a control of the swivel angle in a case where the direction of the target swivel angle does not agree with the curvature direction of the road ahead determined by the road shape determination means, even when the vehicle has reached the control start point. As a result of this, control of the swivel angle is not executed, in a case where the curvature direction of the road stored in the road map data is different from the curvature direction of the actual road, such as in a case where the vehicle is running on a bypass road which is temporarily provided because of road construction. This enables executing control of the swivel angle with high reliability.

According to another aspect of the present invention, there is provided an apparatus for controlling a swivel angle of headlights mounted on a vehicle, wherein the swivel angle of the lights is changeable in a lateral direction of the vehicle, the apparatus comprising: a driving mechanism that changes the swivel angle of the headlights in the lateral direction; steering angle signal acquisition means for acquiring a steering angle signal which corresponds to a steering angle of the vehicle; vehicle velocity signal acquisition means for acquiring a vehicle velocity signal which corresponds to a vehicle velocity of the vehicle, turning judgment means for judging whether or not a steering operation of the vehicle has been performed based on the steering angle signal; target angle determination means for determining a target swivel angle of the headlights based on the steering angle acquired and the vehicle velocity acquired; swivel control means for controlling the swivel angle to the target swivel angle by driving the driving mechanism in response to a case where it is judged by the turning judgment means that steering operation has been performed; shape information acquisition means for acquiring the running road shape-related information related to the shape of the road on which the vehicle is running from the road on which the vehicle is running or the object on the road; road shape determination means for determining the curvature direction of the road ahead based on the running road shape-related information; and control prohibiting means for prohibiting a control of the swivel angle toward the target swivel angle in a case where a direction of the target swivel angle determined by the target angle determination means is in consistent with the curvature direction of the road ahead determined by the road shape determination means, even in a case where it is judged by the turning judgment means that steering operation has been performed.

DESCRIPTION OF THE PREFERRED EMBODIMENT

An embodiment of the present invention will now be described with reference to the drawings.

Figure 1:
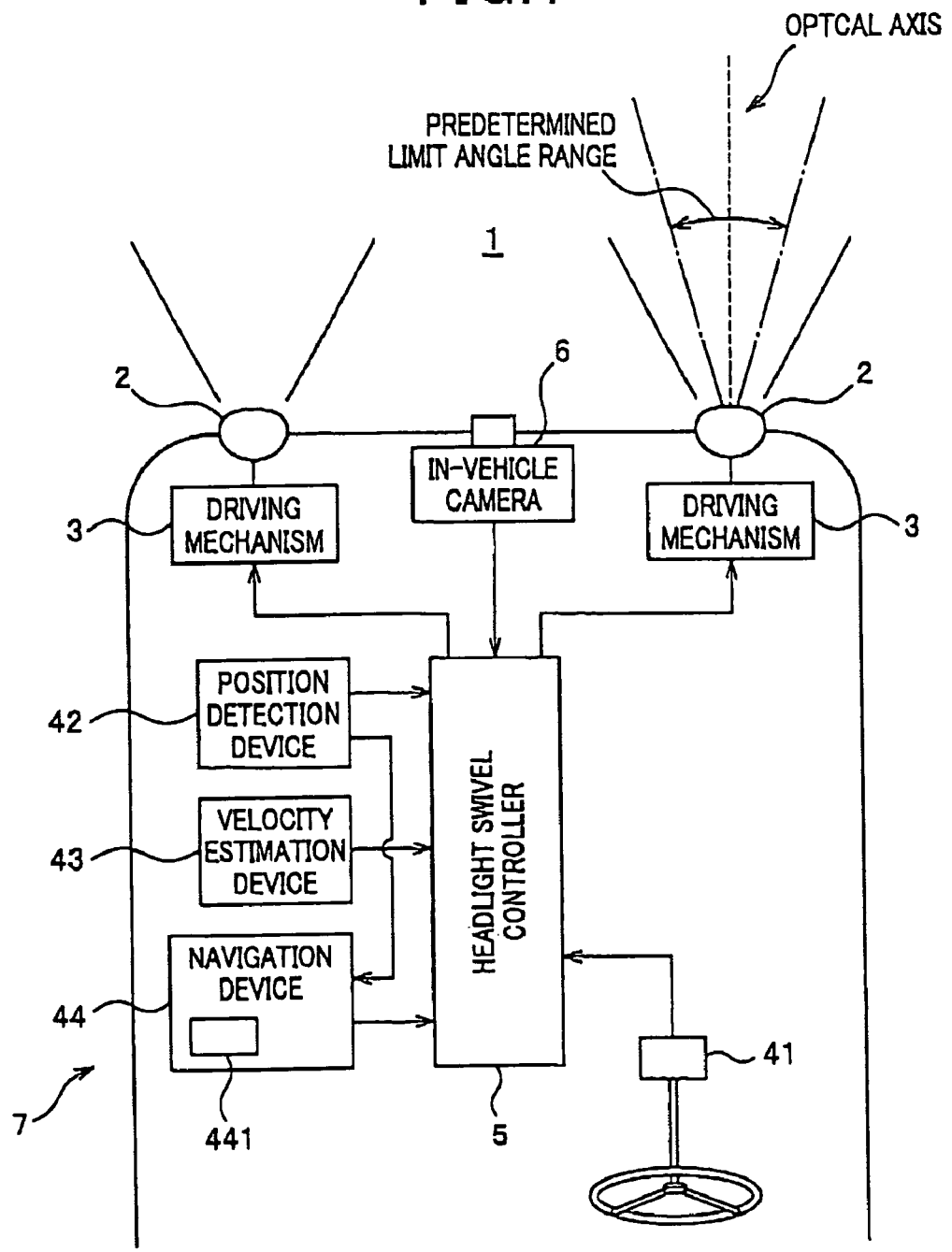
FIG. 1 is a block diagram showing a structure of a headlight apparatus for a vehicle which includes a headlight swivel controller according to an embodiment of the present invention.

FIG. 1 is a block diagram showing a structure of a headlight apparatus 1 for a vehicle which includes a headlight swivel controller 5 (hereinafter, merely referred to as controller) according to an embodiment of the present invention. The headlight apparatus 1 corresponds to "an apparatus for controlling a swivel angle of headlights mounted on a vehicle" of the present invention.

As shown in FIG. 1, the headlight apparatus 1 for a vehicle includes a pair of headlights 2, 2 which are disposed on a front face of a vehicle 7, driving mechanisms 3, 3 which rotationally drive the headlights 2, 2 in a horizontal plane, steering angle detection means 41 which sequentially detects a steering angle ω of the vehicle 7, position detection device 42 which sequentially detects a current position of the vehicle 7, velocity estimation device 43 which sequentially estimates a velocity V of the vehicle 7, navigation device 44, the control apparatus 5, and an in-vehicle camera 6.

The driving mechanism 3 is a known mechanism which rotationally drives the headlights 2 within a predetermined angle range around a rotational axis which is perpendicular to the driving mechanism 3. The driving mechanism 3 has, for example, a structure as follows. That is, the driving mechanism 3 includes: a motor which is electrically connected to the control apparatus 5 and the drive thereof is controlled by the control apparatus 5, a worm gear which is integrally rotated with a rotational axis of the motor, and a worm wheel which is thread-engaged with the worm gear with each other. In addition, the driving mechanism 3 is secured to the worm wheel thereof so that the rotational axis of each of the headlights 2 is integrally rotated with the worm wheel. The driving mechanism 3 enables adjusting a swivel angle α of the optical axis of each headlight 2 within a predetermined angle range (e.g., ±15 degrees). Next, the elbow point is moved by adjustment of the swivel angle α.

The steering angle detection means 41 includes a known steering angle sensor and detects the steering angle ω. When the steering angle ω is represented, the steering position during running straight is set to 0 degree, and one of the right turning or the left turning is represented as a positive steering angle, while the other is represented as a negative steering angle.

The position detection device 42 includes a GPS receiver which sequentially receives data for position detection which have been sequentially transmitted from a plurality of GPS artificial satellites. (The data for position detection include data on the position coordinate of the artificial satellites, data on time and the like.) The position detection device 42 sequentially detects a current position X of the vehicle 7 from the data received by the GPS receiver. In addition to the GPS receiver, the position detection device 42 may include a known sensor to be used for vehicle position detection such as a geomagnetic sensor, a gyroscope sensor or the like, and may detect the position of the vehicle 7 while using them in a complementary manner.

The velocity estimation device 43 includes vehicle velocity sensors each of which is provided in each wheel and outputs a vehicle velocity pulse at an interval corresponding to rotation of the wheel. The velocity estimation device 43 sequentially calculates the velocity V of the vehicle 7 based on the vehicle velocity pulse from these vehicle velocity sensors.

The navigation device 44 includes a storage device 441 which stores road map data. The road map data stored in the storage device 441 includes node information and link information for navigation points arranged in sections which are formed by arbitrarily dividing the road in the direction of the lane. The position coordinate information and the like for each navigation point is stored as the node information, and connection information between the navigation points (a curvature R, a vector, i.e., curvature direction) and the like is stored as the link information. In addition, the navigation point which exists at the end of a curved road is set as a curved road end point. Note that the curved road refers to a road which has a curvature R which is equal to or less than a value which has been set in advance.

Next, the navigation device 44 determines which road the vehicle 7 is running from the current position X of the vehicle 7 detected by the position detection device 42 and the road map data stored in the storage device 441. In a case where a guidance route has been set, the navigation device 44 executes a predetermined guiding operation so that the vehicle 7 is running following the guidance route.

An imaging area has been set for the in-vehicle camera 6 so as to enable the in-vehicle camera 6 picking up an image of a road in front of the vehicle. The in-vehicle camera 6 picks up an image of the road in front of the vehicle according to a command from the control apparatus 5 or continuously, and supplies the control apparatus 5 with a signal which represents the picked-up image of the road in front of the vehicle.

The control apparatus 5 is a computer which includes a central processing unit (CPU), a read only memory (ROM), a random access memory (RAM) and the like in the inside thereof, not shown. The control apparatus 5 controls the swivel angle α of each headlight 2 by executing programs stored in the ROM, while utilizing a temporary storage function of the RAM.

Figure 2:
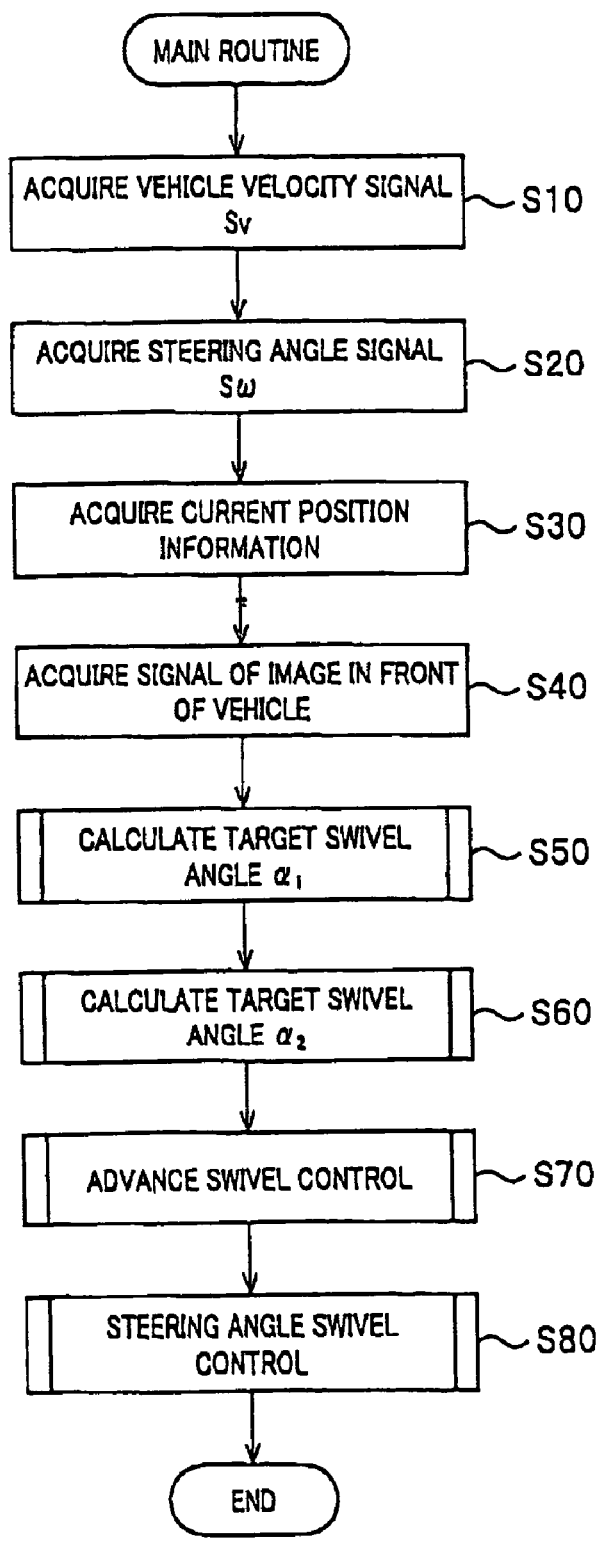
FIG. 2 is a chart showing a main routine which is executed for controlling a swivel angle.

FIG. 2 shows a main routine which is executed by the control apparatus 5 for controlling the swivel angle α. The processing shown in FIG. 2 is repeatedly executed at a predetermined cycle.

In FIG. 2, first, at Step S10 which corresponds to the vehicle velocity signal acquisition means, a vehicle velocity signal Sv which represents the vehicle velocity V is acquired from the velocity estimation device 43. At subsequent Step S20, that is, the processing corresponding to the road curvature information acquisition means, a steering angle signal Sω which represents a steering angle ω is acquired from the steering angle detection means 41.

At the subsequent Step S30, that is, the processing corresponding to the position information acquisition means, the current position information which represents the current position X is acquired from the position detection device 42. At subsequent Step S40, the signal of the image in front of the vehicle is acquired from the in-vehicle camera 6.

At subsequent Step S50, the sub routine shown in FIG. 3 to be described later is executed, whereby a target swivel angle $\alpha_1$ which serves as the target value of the swivel angle α in the steering angle swivel control is calculated. At subsequent Step S60, the sub routine shown in FIG. 4 to be described later is executed, whereby a target swivel angle $\alpha_2$ which serves as the target value of the swivel angle α in the advance swivel control is calculated.

Subsequently, Steps S70 to S80, i.e., the processing corresponding to the swivel control means are executed. At Step S70, the advance swivel control is executed by executing a sub routine shown in FIG. 5 to be described later. At Step S80, the steering angle swivel control is executed by executing a sub routine shown in FIG. 6 to be described later.

The sub routine shown in FIG. 3 for calculating the target swivel angle $\alpha_1$ will now be described. In FIG. 3, first at Step S51, a steady circle turning radius R is calculated by substituting to the following Equation (1) the vehicle velocity V and the steering angle ω which are respectively represented by the vehicle velocity signal Sv and the steering angle signal Sω which are respectively acquired at Step S10 and S20 in FIG. 2:

$$R=(L/(\omega \times S)) \times (1+KV^2) \qquad (1)$$

In Equation (1), L denotes the wheel base, S denotes the steering gear ratio, and K denotes the stability factor, each of which is a constant which has been set in advance.

Next, at subsequent Step S52, the target swivel angle $\alpha_1$ is calculated by substituting the vehicle velocity V and the steady circle turning radius R calculated at Step S51 to the following Equation (2). Note that, in Equation (2), T denotes the light distribution point determination time and, for example, it is set to three seconds.

$$\alpha_1=((T \times V/2)/2nR) \times 360 \qquad (2)$$

Figure 7:
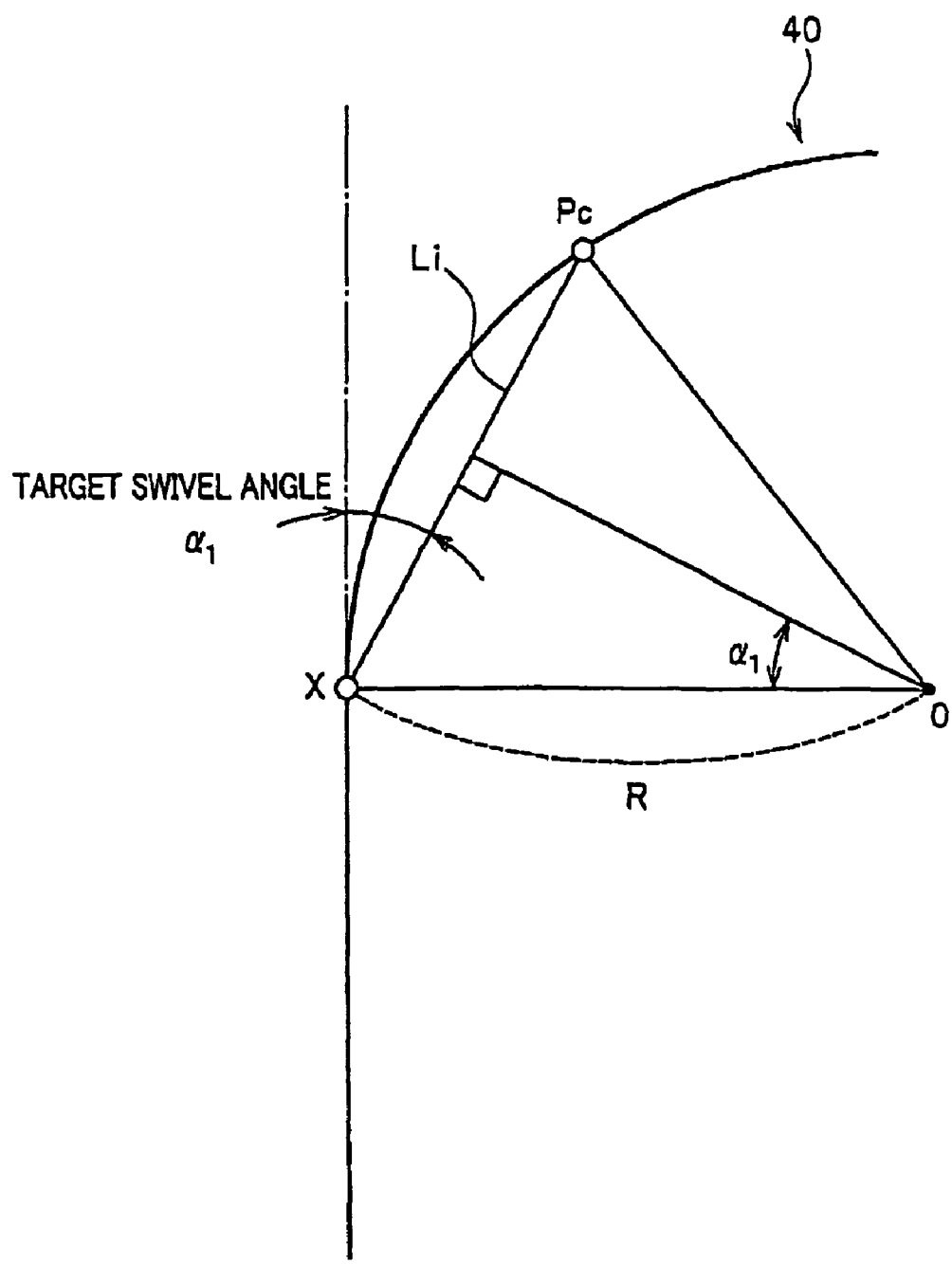
FIG. 7 is a chart explaining the reason why the target swivel angle can be calculated with an equation.

In Equation (2) as described above, T×V denotes the length of an arc on which the vehicle 7 is running along a circle having the steady circle turning radius R at the velocity V for T seconds. As shown in FIG. 7, the center angle of the arc with the length T×V/2 in the circle having the steady circle turning radius R shall become the target swivel angle $\alpha_1$. Accordingly, the target swivel angle α can be calculated from Equation (2) as described above.

In FIG. 7, numeral 40 denotes the actual running line of the vehicle 7. If it is assumed that the vehicle 7 is running at the velocity V, the vehicle 7 which is positioned at the current position X will be positioned substantially at a distribution point Pc T seconds later. Accordingly, the target swivel angle α1 is to be set so that an optical axis Li of each headlight 2 passes through the light distribution point Pc thereof.

Figure 4:
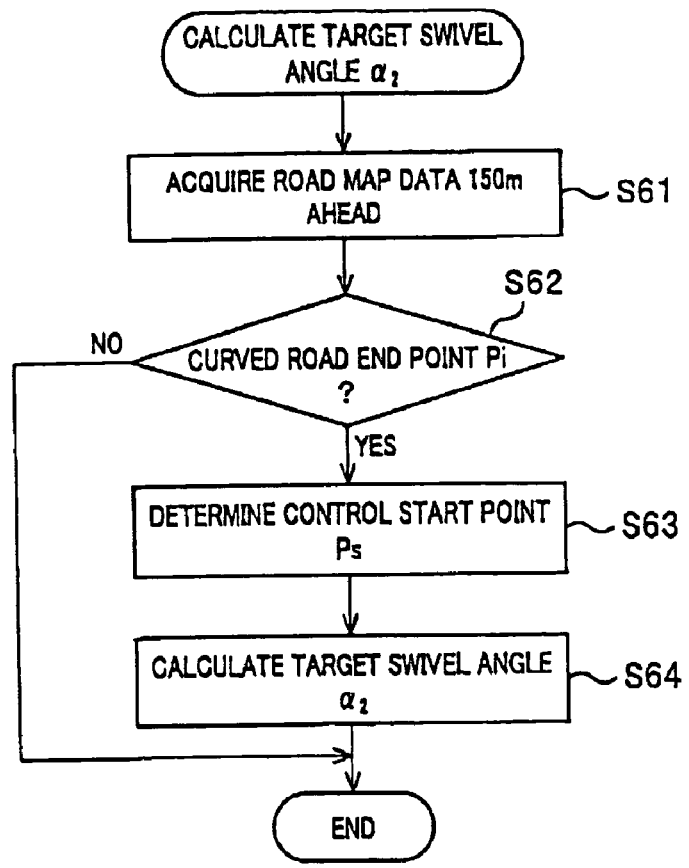
FIG. 4 is a chart showing a sub routine which is executed a for calculating a further target swivel angle.

The sub routine shown in FIG. 4 for calculating the target swivel angle $\alpha_2$ will now be described. In FIG. 4, first at Step S61, that is, the processing corresponding to the road map data acquisition means, the road map data of a point which is in front of the current position X by a predetermined distance along the road on which the vehicle is running (150 m in this case) is acquired from the storage device 441 of the navigation device 44.

At subsequent Step S62, it is judged whether or not the point 150 m ahead is a curved road end point Pi based on the road map data acquired at Step S61. If negative judgment is made at Step S62, the routine in FIG. 4 is terminated, and the routine advances to Step S70 in FIG. 2.

On the other hand, if positive judgment is made at Step S62, the processing advances to Step S63, that is, the processing corresponding to the control start point determination means. At Step S63, a control start point Ps is determined based on the curved road end point Pi. The control start point Ps refers to a point the vehicle 7 reaches the above-described curved road end point Pi after a time period which has been set in advance (3 seconds later in this case), and it is determined according to the following manner. Specifically, the vehicle velocity V acquired at Step S10 in FIG. 2 is used, and the point which is closer to the vehicle than the curved road end point Pi by VX3 (m) is determined as the control start point Ps.

Subsequent Step S64 is the processing corresponding to the target angle determination means. The target swivel angle α2 is calculated by substituting the vehicle velocity V represented by the vehicle velocity signal Sv and the curvature R contained in the road map data acquired at Step S61 to Equation (2) as described above. Next, a positive or minus sign is assigned to the calculated value based on the curvature direction contained in the road map data acquired at Step S61.

Figure 5:
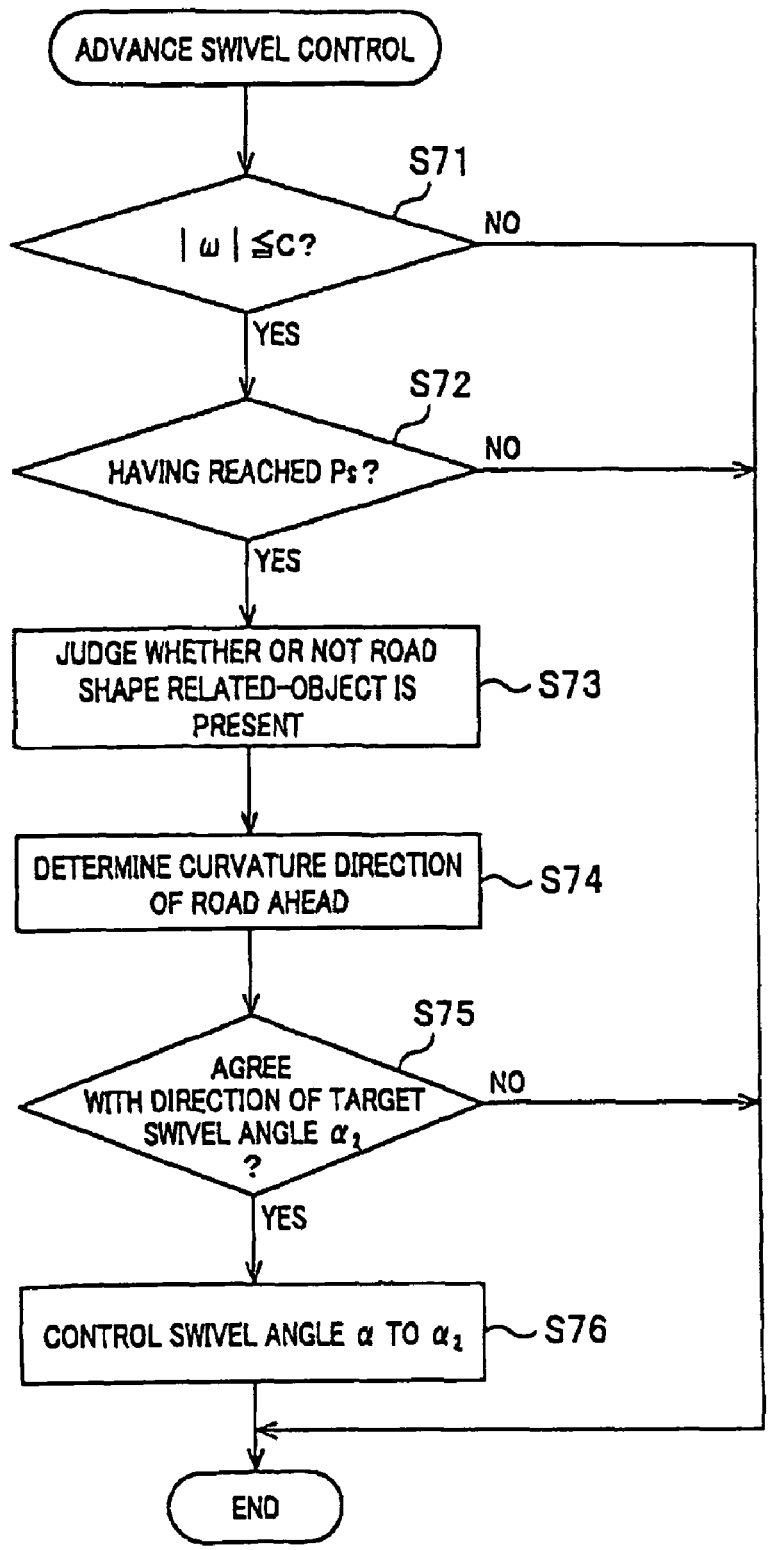
FIG. 5 is a chart showing a sub routine which is executed for executing an advance swivel control.

The sub routine in FIG. 5 for executing the advance swivel control will now be described. In FIG. 5, at Step S71, it is judged whether or not the absolute value of the steering angle ω represented by the steering angle signal Sω acquired at Step S20 in FIG. 2 is equal to or less than a steering angle swivel switch angle C which has been set in advance to a value close to 0. If negative judgment is made at Step S71, the sub routine is terminated and the routine advances to Step S80 in FIG. 2. On the other hand, if positive judgment is made, the routine advances to Step S72.

At Step S72, it is judged whether or not the vehicle 7 has reached the control start point Ps determined at Step S63 in FIG. 4 based on the current position information acquired at Step S30 in FIG. 2. If the vehicle 7 has not reached the control start point Ps, or if the control start point Ps has not been determined, negative judgment is made. If negative judgment is made, the sub routine is terminated and the routine advances to Step S80 in FIG. 2. On the other hand, if positive judgment is made, Steps S73 to S74, that is, the processing corresponding to the road shape determination means are executed.

At Step S73, the signal of the image in front of the vehicle acquired at Step S40 in FIG. 2 is analyzed by a known image analysis method, and it is judged whether or not either one of (1) a road compartment line, (2) a predetermined road traffic sign showing the shape of the road, (3) a pavement marking for deceleration, or (4) an advancing vehicle is present within the image. Note that the advancing vehicle refers to a vehicle which is running in the front of the own vehicle and in the same direction as the own vehicle.

The above-described (1) to (4) are road shape-related objects which are related to the shape of the road on which the vehicle 7 is running. The signal of the image in front of the vehicle for judging whether or not the road shape-related objects are present corresponds to the running road shape-related information. Accordingly, Step S40 in FIG. 2 for acquiring the signal of the image in front of the vehicle is the processing corresponding to the shape information acquisition means.

Herein, the road compartment lines (1) include a street center line, a running road line, and a running road edge line and the like. The road compartment line is a road shape-related object because the road compartment line is drawn continuously in the longitudinal direction of the road and is drawn at a constant width direction position regardless of the position in the longitudinal direction of the road. Judgment on whether or not the road compartment line is present may be made, for example, by executing ordinary compartment line recognition processing. In the road compartment line recognition processing, binalization of the image in front of the vehicle is executed, and white portions and yellow lines are extracted from the binalize image, and whereby the road compartment line is recognized.

Figure 8:
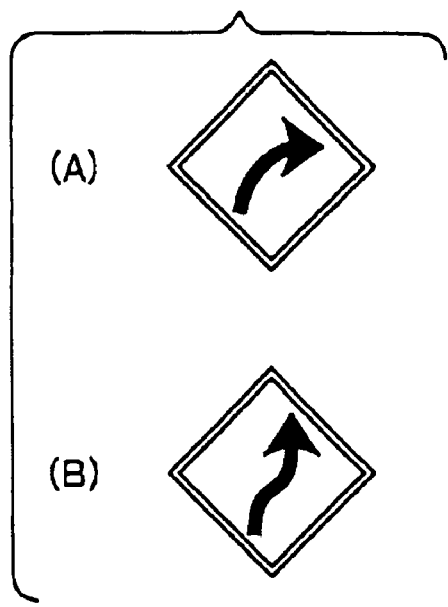
FIG. 8A and FIG. 8B are illustrations of road traffic signs showing road shapes.

The road traffic signs showing the shape of the road (2) include a danger warning sign "curve to right (or left)" shown in FIG. 8A, "right (or left) reverse curve" as shown in FIG. 8B and the like. To judge whether or not the road traffic sign showing the shape of the road is present, for example, an image of the road traffic sign showing the shape of the road has been stored, and pattern matching between the image thereof and the image in front of the vehicle is used.

Figure 9:
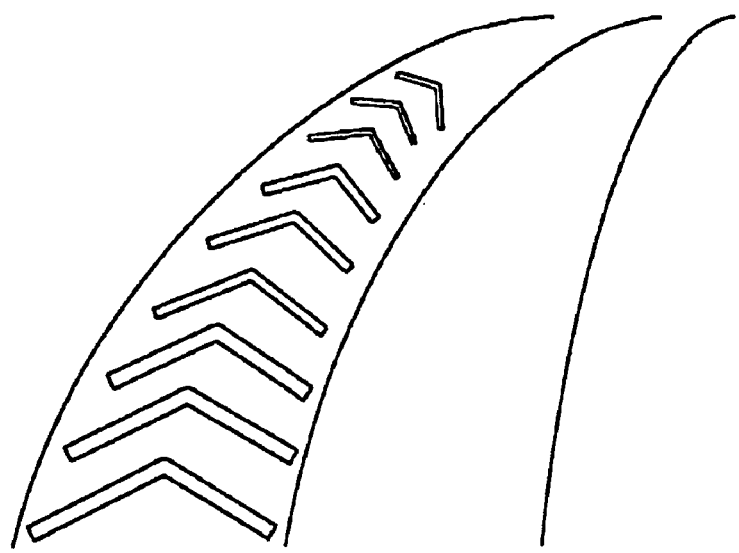
FIG. 9 is a chart showing an example of a pavement marking for deceleration.

An example of the pavement markings for deceleration (3) is shown in FIG. 9. The pavement marking for deceleration has the common characteristics as the road compartment line in that both signs are indicated on the road surface, and thus judgment on whether or not a pavement marking for deceleration is present may be made using the similar method as that for the road compartment line.

To judge whether or not an advancing vehicle (4) is present, for example, a reference image of the vehicle has been stored, and pattern matching between the image thereof, and the image in front of the vehicle is used.

At Step S74, the curvature direction of the road ahead is determined based on the judgment result at Step S73. Note that the curvature direction to be determined at Step S74 is the right direction, the left direction, or the straight line. For example, in a case where it can be judged that a road compartment line is present, the curvature direction of the road compartment line is determined as the curvature direction of the road ahead. In a case where it can be judged that the road traffic sign showing the shape of the road is present, the curvature direction of the road ahead is determined based on the road traffic sign which can be recognized. In a case where it can be judged that a plurality of pavement markings for decelerations are present, the curvature direction of the road ahead is determined based on whether the positions of the pavement markings for deceleration within the image are changing in the leftward direction or in the rightward direction as the positions of the pavement markings for deceleration move away from the own vehicle in the image. Also in a case where it can be judged that an advancing vehicle is present, the curvature direction of the road ahead is determined based on whether the position of the advancing vehicle is moved in the leftward direction or in the rightward direction within the image.

At subsequent Step S75, it is judged whether or not the curvature direction of the road ahead determined at Step S74 agrees with the direction of the target swivel angle $\alpha_2$ calculated at Step S64 in FIG. 4. If negative judgment is made at Step S75, the sub routine is terminated without executing control of the swivel angle.

On the other hand, if positive judgment is made at S75 the routine advances to Step S76. At Step S76, the actual swivel angle $\alpha$ is increased to the target swivel angle $\alpha_2$ calculated at Step S64 in FIG. 4 by a predetermined unit angle by driving the driving mechanism 3. Note that the predetermined unit angle has been set smaller enough than the average target swivel angle $\alpha_2$.

Figure 6:
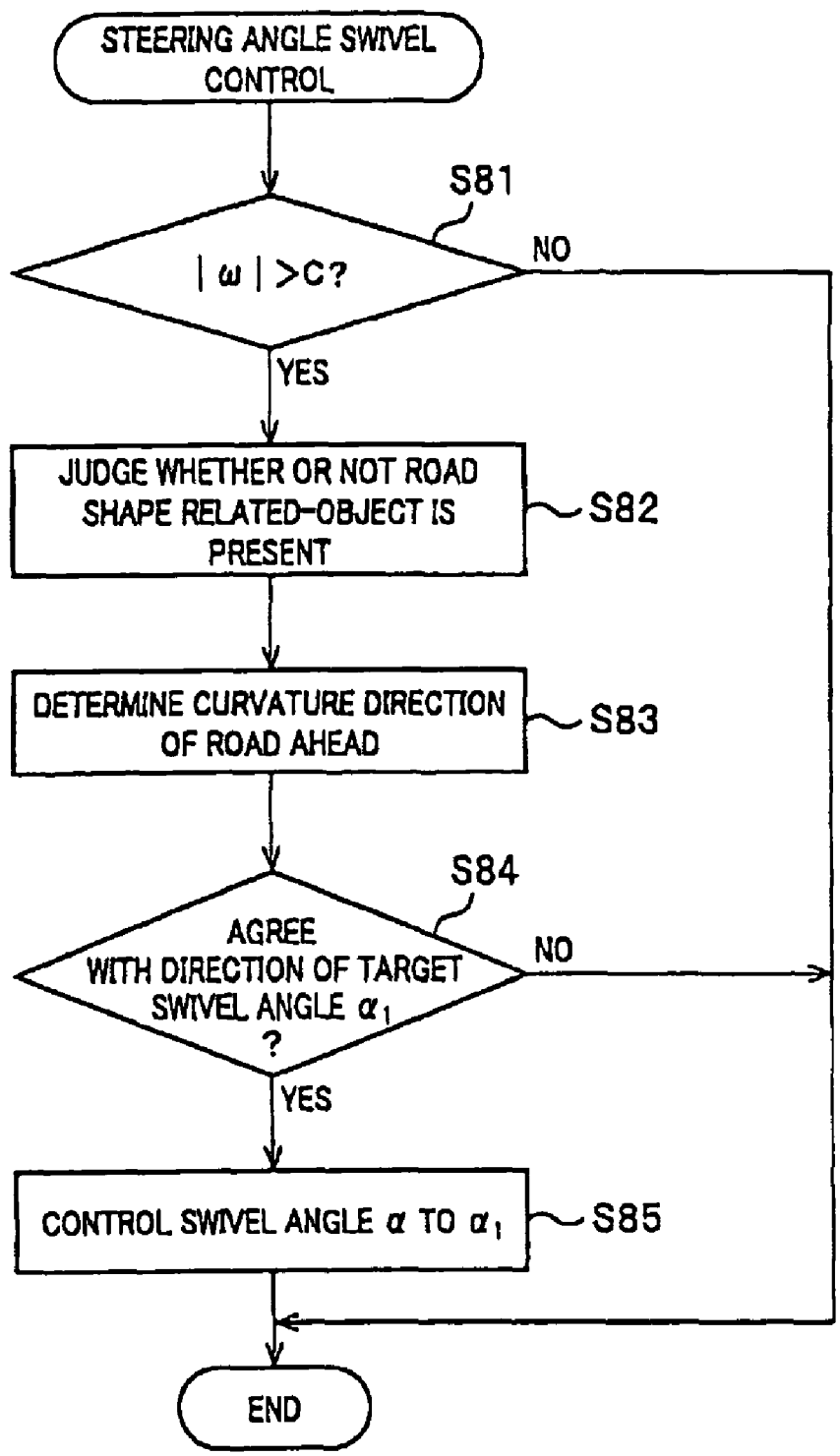
FIG. 6 is a chart showing a sub routine which is executed for executing a steering angle swivel control.

The sub routine in FIG. 6 for executing the steering angle swivel control will now be described. In FIG. 6, at Step S81, it is judged whether or not the absolute value of the steering angle $\omega$ represented by the steering angle signal S$\omega$ acquired at Step S20 in FIG. 2 is larger than the above-described steering angle swivel switch angle C. If positive judgment is made, it can be judged that steering operation has been performed. Accordingly, Step S81 is the processing corresponding to the turning judgment means.

If negative judgment is made at Step S81, the sub routine is terminated. On the other hand, if positive judgment is made, the routine advances to Step S82. Steps S82, S83 are the same processing as Steps S73, S74 in FIG. 5, respectively. Accordingly, Steps S82, S83 are also the processing corresponding to the road shape determination means.

In other words, also in the steering angle swivel control, it is judged whether or not the road shape-related objects are present from the image in front of the vehicle (S82), and the curvature direction of the road ahead is determined from the judgment result (S83).

Figure 3:
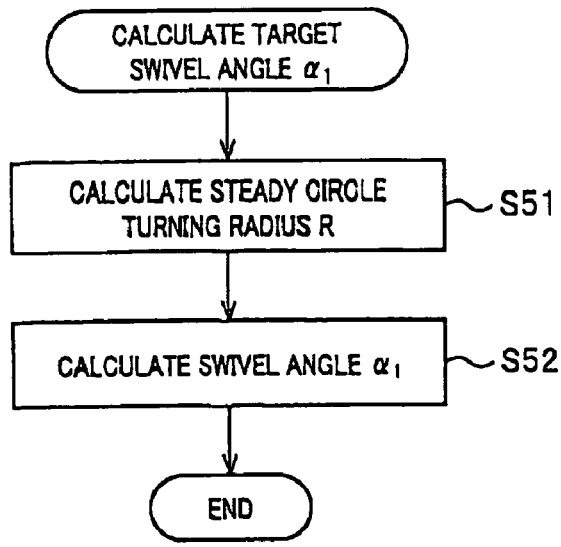
FIG. 3 is a chart showing a sub routine which is executed for calculating a target swivel angle.

Next, at subsequent Step S84, it is judged whether or not the curvature direction of the road ahead determined at Step S83 agrees with the direction of the target swivel angle $\alpha_1$ calculated at Step S54 in FIG. 3. If negative judgment is made at Step S84, the sub routine is terminated without executing control of the swivel angle.

On the other hand, if positive judgment is made at Step S84 the routine advances to Step S85. At Step S85, the actual swivel angle $\alpha$ is increased toward the target swivel angle $\alpha_1$ calculated at Step S52 in FIG. 3 by a predetermined unit angle by driving the driving mechanism 3.

As described above, the main routine of FIG. 2 is repeatedly executed at a predetermined cycle. Accordingly, in a case where the conditions are satisfied, the actual swivel angle α is changed toward the target swivel angle $α_1$ or $α_2$ by repeatedly executing Step S76 in FIG. 5 or Step S85 in FIG. 6.

According to the present embodiment as described hereinabove, the signal of the image in front of the vehicle containing the information on the road on which the vehicle 7 is running and the object on the road is acquired from the in-vehicle camera 6 (S40), and the curvature direction of the road ahead is determined by analyzing the image in front of the vehicle (S73, S74, S82, S83). The curvature direction of the road ahead which is determined in this manner correctly indicates the curvature direction of the road, even if the road ahead is a bypass road which is temporarily provided.

In addition, in the swivel control in FIG. 5, control of the swivel angle is not executed in a case where the direction of the target swivel angle $α_2$ does not agree with the curvature direction of the road ahead determined at S74, even when the vehicle 7 has reached the control start point Ps. As a result of this, control of the swivel angle is not executed, in a case where the curvature direction of the road stored in the road map data is different from the curvature direction of the actual road, such as in a case where the vehicle is running on a bypass road which is temporarily provided because of road construction. This enables executing control of the swivel angle with high reliability.

In addition, in the steering angle swivel control in FIG. 6, control of the swivel angle is not executed in a case where the direction of the target swivel angle $α_1$ does not agree with the curvature direction of the road ahead determined at S83, even when it is judged that steering operation has been performed. As a result of this, a wrong swivel control is not executed on a road of which the curvature direction is changing in a short district, in a case where the curvature direction of the road stored in the road map data is different from the curvature direction of the actual road. This enables enhancing reliability of the swivel control.

The embodiment of the present invention has been described hereinabove, but the present invention is not limited to the embodiment as described above and the following embodiments are also included in the technical scope of the present invention. Furthermore, other than the embodiments to be described below, various modifications may be embodied within the scope of the invention as long as the modifications do not deviate from the summary of the invention.

For example, in the steering angle swivel control, in a case where it is judged that steering operation has been performed at Step S81 in FIG. 6, Step S85 may be executed without executing S82 to S84.

In addition, in the above-described embodiment, judgment on whether or not an advancing vehicle is present is made based on the signal from the in-vehicle camera 6. However, the means for judging whether or not an advancing vehicle is present is not limited to this. For example, in a case where a radar device which emits a transmitted wave (millimeter wave or laser beam) toward the front of the vehicle and which receives the reflected wave of the transmitted wave is installed, the signal of the reflected wave may be acquired from the radar device and judgment on whether or not an advancing vehicle is present may be made based on the signal of the reflected wave.

In addition, in the above-described embodiment, the control start point Ps is determined based on the vehicle velocity V. Alternatively, a point closer to the own vehicle from the curved road end point Pi by a distance which has been set in advance may be set to the control start point Ps.

What is claimed is:

1. An apparatus for controlling a swivel angle of headlights mounted on a vehicle, wherein the swivel angle of the headlights is changeable in a lateral direction of the vehicle, the apparatus comprising:
    a driving mechanism that changes the swivel angle of the headlights in the lateral direction;
    means for acquiring a steering angle signal which corresponds to a steering angle of the vehicle;
    means for acquiring a vehicle velocity signal which corresponds to a vehicle velocity of the vehicle,
    means for judging whether or not a steering operation of the vehicle has been performed based on the steering angle signal;
    means for determining a target swivel angle of the headlights based on the steering angle acquired and the vehicle velocity acquired;
    means for controlling the swivel angle to the target swivel angle by driving the driving mechanism in response to a case where it is judged by the judging means that the steering operation has been performed;
    means for acquiring running road shape-related information related to a shape of the road on which the vehicle is running from the road on which the vehicle is running or an object on the road;
    means for determining a curvature direction of the road ahead based on the running road shape-related information; and
    means for prohibiting control of the swivel angle toward the target swivel angle in a case where a direction of the target swivel angle determined by the means for determining the target swivel angle is inconsistent with the curvature direction of the road ahead determined by the means for determining the curvature direction of the road ahead, even in a case where it is judged by the judging means that the steering operation has been performed.

2. The apparatus according to claim 1, wherein
    the means for acquiring the running shape-related information acquires as the running road shape-related information an image in front of the vehicle from a camera installed in the vehicle and which picks up an image in front of the vehicle, and
    the means for determining the curvature direction of the road ahead determines the curvature direction of the road ahead by analyzing the image in front of the vehicle.

3. The apparatus according to claim 2, wherein the means for determining the curvature direction of the road ahead includes means for judging whether or not a road compartment line is within the image by analyzing the image in front of the vehicle, and means for determining the curvature direction based on the shape of the road compartment line in a case where the means for determining the curvature direction of the road ahead judges that the road compartment line is present.

4. The apparatus according to claim 2, wherein the means for determining the curvature direction of the road ahead includes means for judging whether or not a road traffic sign showing the shape of the road ahead is present within the image by analyzing the image in front of the vehicle, and means for determining the curvature direction based on the road traffic sign in a case where the means for determining the curvature direction of the road ahead judges that the road traffic sign is present.

5. The apparatus according to claim 2, wherein the means for determining the curvature direction of the road ahead includes means for judging whether or not a plurality of pavement markings for deceleration which are indicated on the road continuously are present by analyzing the image in front of the vehicle, and means for determining the curvature direction based on the direction in which the pavement markings for deceleration change in a case where the means for determining the curvature direction of the road ahead judges that the plurality of pavement markings for deceleration are present.

6. The apparatus according to claim 2, wherein the means for determining the curvature direction of the road ahead includes means for judging whether or not an advancing vehicle which is running ahead is present within the image by analyzing the image in front of the vehicle, and means for determining the curvature direction based on a positional change of the advancing vehicle in a case where the means for determining the curvature direction of the road ahead judges that the advancing vehicle is present.

7. The apparatus according to claim 1, wherein,
the means for acquiring the running shape-related information acquires, as the running road shape-related information, a signal of a reflected wave from a radar device installed in the vehicle, which emits a transmitted wave to the front of the vehicle, and which receives a reflected wave of the transmitted wave, and
the means for determining the curvature direction of the road ahead includes means for judging whether or not an advancing vehicle which is running in the front is present based on the signal of the reflected wave, and means for determining the curvature direction based on a positional change of the advancing vehicle in a case where the means for determining the curvature direction of the road ahead judges that the advancing vehicle is present.

8. The apparatus according to claim 1, wherein the prohibiting means prohibits control of the swivel angle toward the target swivel angle prior to the control of the swivel angle.

* * * * *